(12) United States Patent
Gutkin

(10) Patent No.: US 7,416,816 B2
(45) Date of Patent: Aug. 26, 2008

(54) ELECTRICAL STORAGE BATTERY WITH AN ELECTROLYTE FILLED VESSEL HAVING A FRONT WALL ELECTRODE

(75) Inventor: Timofei Gutkin, Hamburg, NJ (US)

(73) Assignee: I. Zborovsky, Dix Hills, NY (US), Partial Interest ( * ) Notice: Subject to any disclaimer, the term of this patent is extended or adjusted under 35 U.S.C. 154(b) by 742 days.

(21) Appl. No.: 10/787,960

(22) Filed: Mar. 1, 2004

(65) Prior Publication Data

US 2004/0166403 A1 Aug. 26, 2004

Related U.S. Application Data

(63) Continuation-in-part of application No. 09/883,154, filed on Jun. 18, 2001, now Pat. No. 6,699,615.

(51) Int. Cl.
*H01M 4/64* (2006.01)
*H01M 10/02* (2006.01)

(52) U.S. Cl. .................. 429/239; 429/188; 429/220; 429/244

(58) Field of Classification Search .............. 320/166; 429/239, 220, 244
See application file for complete search history.

(56) References Cited

U.S. PATENT DOCUMENTS

| 4,789,610 A | * | 12/1988 | Kondo et al. ............ 429/321 |
| 5,429,893 A | * | 7/1995 | Thomas ................. 429/333 |
| 6,639,786 B2 | * | 10/2003 | Noguchi et al. ........... 361/502 |

* cited by examiner

*Primary Examiner*—Mark Ruthkosky

(57) ABSTRACT

A battery providing a storage of electrical energy with electrolytic processes of charging and discharging, comprising a first vessel having a front wall formed as an electrode, a second vessel having a front wall formed as an electrode, the vessels being arranged so that the front walls formed as electrodes face one another, the vessels being filled with an electrolyte, the vessels having other walls which are composed of dielectric.

17 Claims, 10 Drawing Sheets

ELECTRICAL STORAGE BATTERY WITH AN ELECTROLYTE FILLED VESSEL HAVING A FRONT WALL ELECTRODE

CROSS-REFERENCE TO A RELATED APPLICATION

This application is a continuation-in-part of patent application Ser. No. 09/883,154 filed Jun. 18, 2001 now U.S. Pat. No. 6,699,615.

BACKGROUND OF THE INVENTION

The present invention relates to electrical storage batteries.

Batteries and methods of the above mentioned general type are known in the art. It is believed to be advisable to further improve the existing storage batteries.

SUMMARY OF THE INVENTION

Accordingly, it is an object of the present invention to provide an electrical storage which is a further improvement of the existing batteries.

In keeping with these objects and with others which will become apparent hereinafter, one feature of the present invention resides, briefly stated, in an electrical storage battery which has a first vessel having a front wall formed as an electrode; a second vessel having a front wall formed as an electrode, said vessels being arranged so that said front walls formed as electrodes face one another, said vessels being filled with an electrolyte, said vessels having other walls which are composed of dielectric.

When the electrical storage battery is designed in accordance with the present invention, it is possible to charge the battery so that it accumulates and discharge a significant quantity of electrical energy which exceeds many times the electrical storage capacity of the existing batteries.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
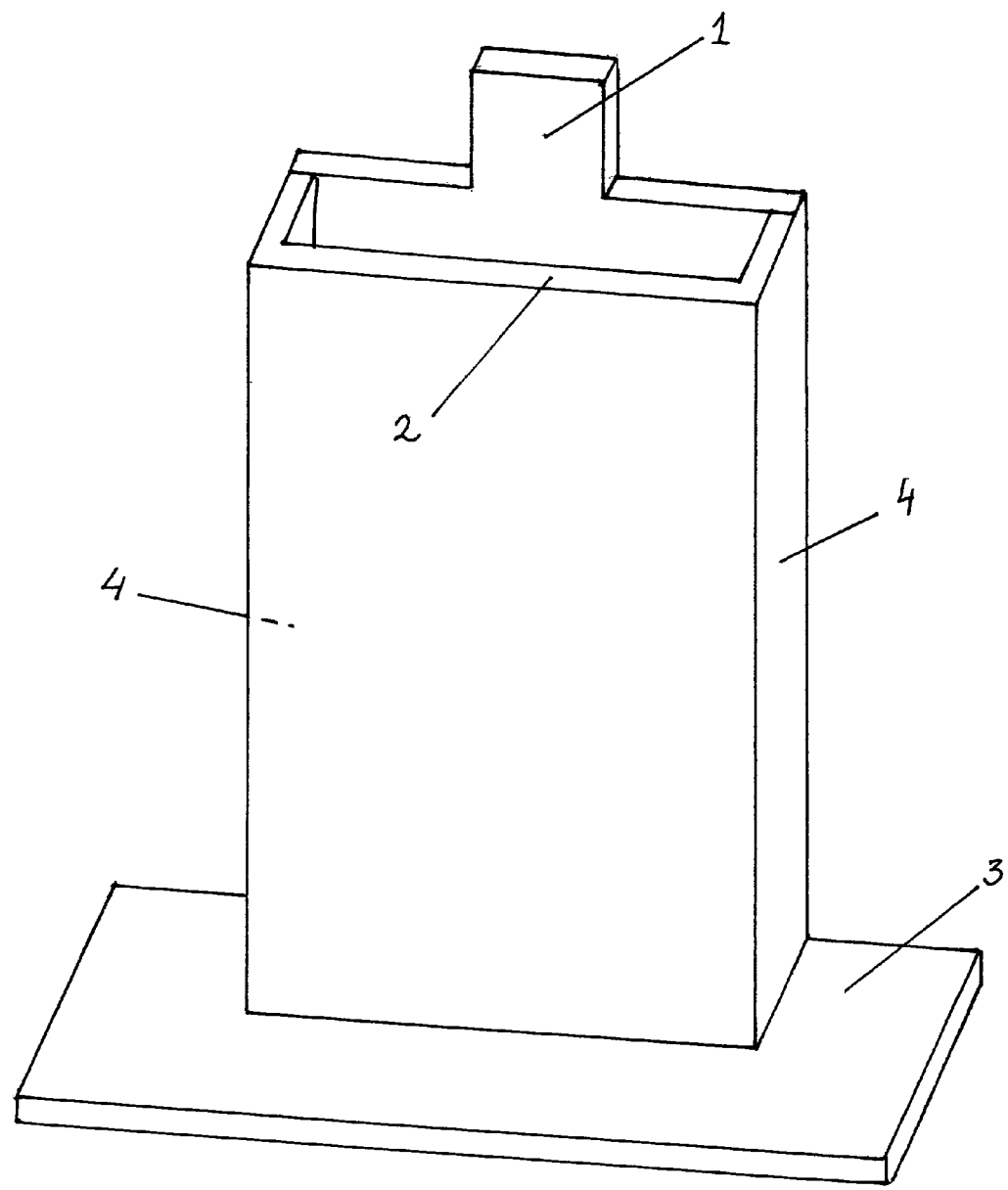
FIG. 1 is a view showing a vessel of an electrical storage battery in accordance with the present invention.

An electrical storage battery in accordance with the present invention has two vessels, one of which is shown in FIG. 1. The vessel has a front wall 1 composed of a copper sheath which forms a copper electrode. It further has a rear wall 2 which preferably has the same size, a bottom support 3, and transverse walls 4, all composed of a dielectric material. All walls are hermetically connected with one another, so as to form the vessel, preferably having the shape of a parallelepiped.

As can be seen from FIG. 1, the transverse size of the vessel is small when compared with front and rear walls 1, 2. The support 3 forms a bottom of the vessel and has an increased size to provide a stable position of the vessel.

Figure 2:
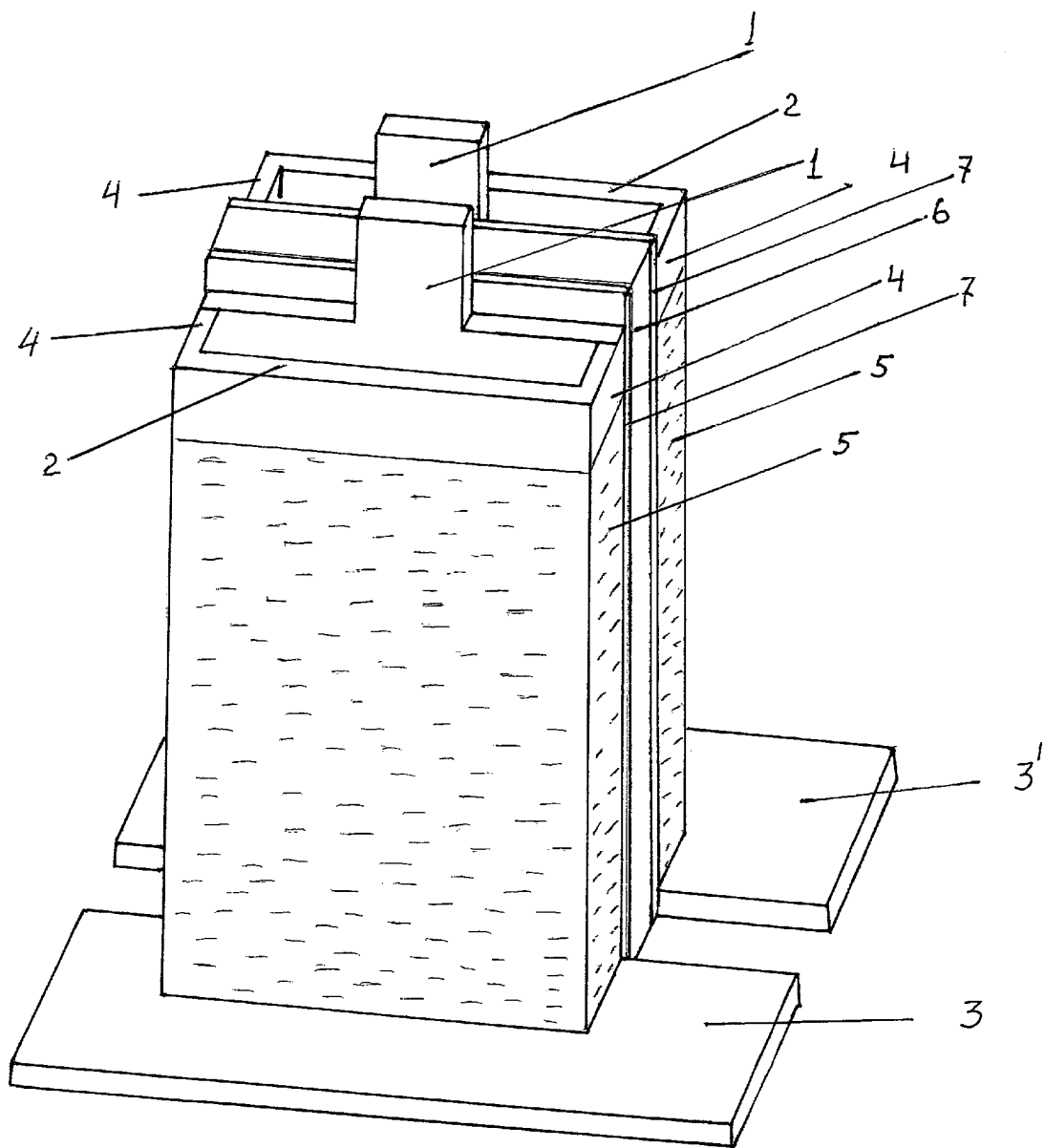
FIG. 2 is a perspective view of the electrical storage battery in accordance with the present invention.

As can be seen from FIG. 2, two such vessels are arranged so that the copper electrodes 1 and 1' face one another and are located at a small distance from one another. The vessels are filled with electrolyte 5 and 5', for example aqueous solution of $CuSO_4$.

Figure 3:
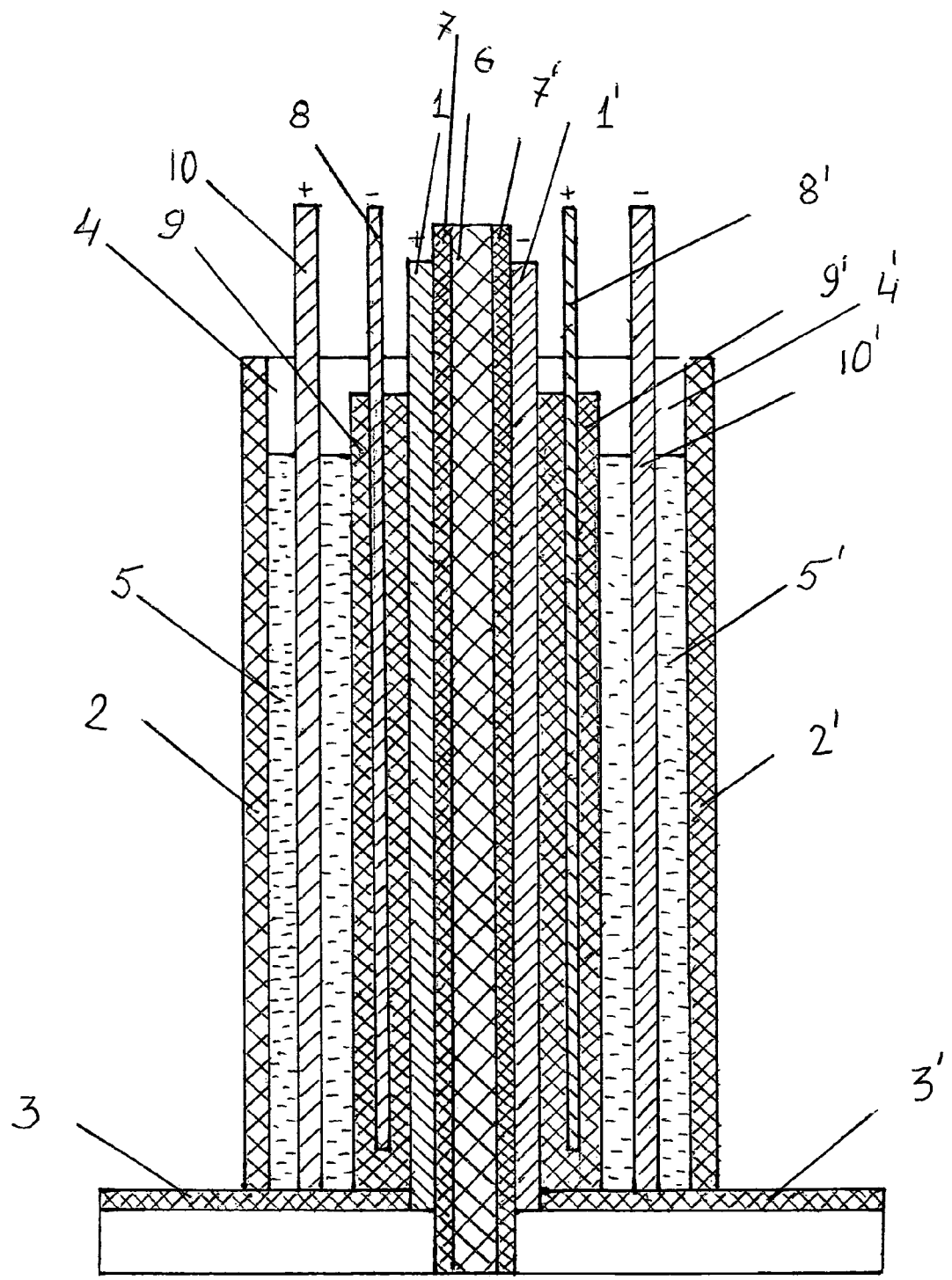
FIG. 3 is a view showing a transverse cross-section of the electrical storage battery in accordance with the present invention.
Figure 4:
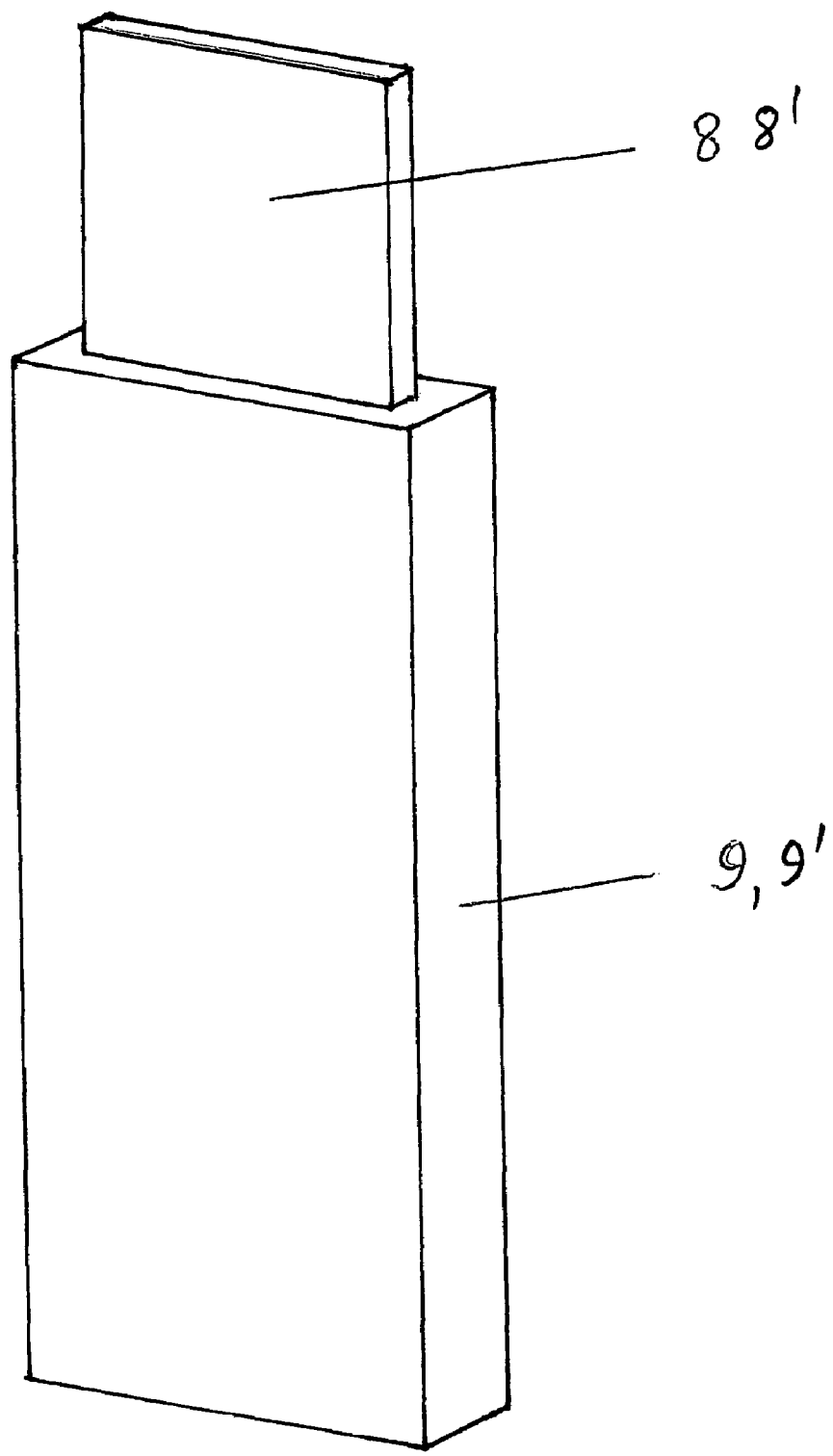
FIG. 4 is a view showing an electrode which is formed as a copper sheath surrounded by a dielectric, of the inventive electrical storage battery.
Figure 5:
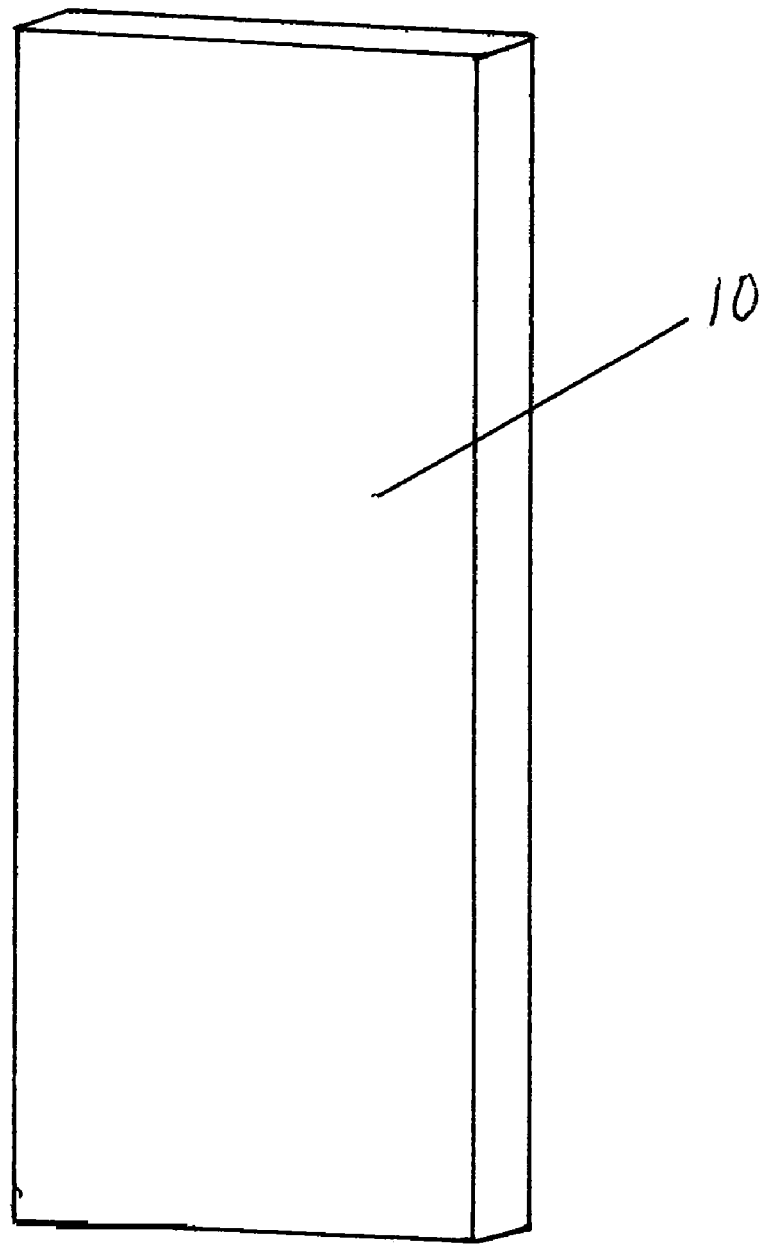
FIG. 5 is a view showing an auxiliary copper electrode of the inventive electrical storage battery.

A copper sheath 8, 8' which is hermetically surrounded from all sides by a dielectric 9, 9' shown in FIG. 4 is pressed in each vessel against the inner surface of the copper electrode 1 and 1', the surface facing the aqueous solution $CuSO_4$. The dielectric has a high dielectric permeability for example e=7000, and can be formed as segneto-electric. As a result the copper sheath 8, 8' shown in FIG. 3 and located inside the dielectric 9, 9' is insulated from the electrolyte 5, 5' and from the copper electrode 1, 1' in each vessel. An additional copper electrode 10, 10' is located in each vessel in the electrolyte 5, 5' near the dielectric 9, 9' which surrounds the copper sheath 8, 8'.

Plates 7, 7' composed of a special dielectric, for example segneto electric, with dielectric permeability e=7000 as shown in FIG. 1 are located between the vessels. Therefore it is possible to increase the capacity of the thusly formed capacitor composed of two copper electrodes 7000 and to increase the charge in the electrical storage battery 7000 times as well.

Figure 7:
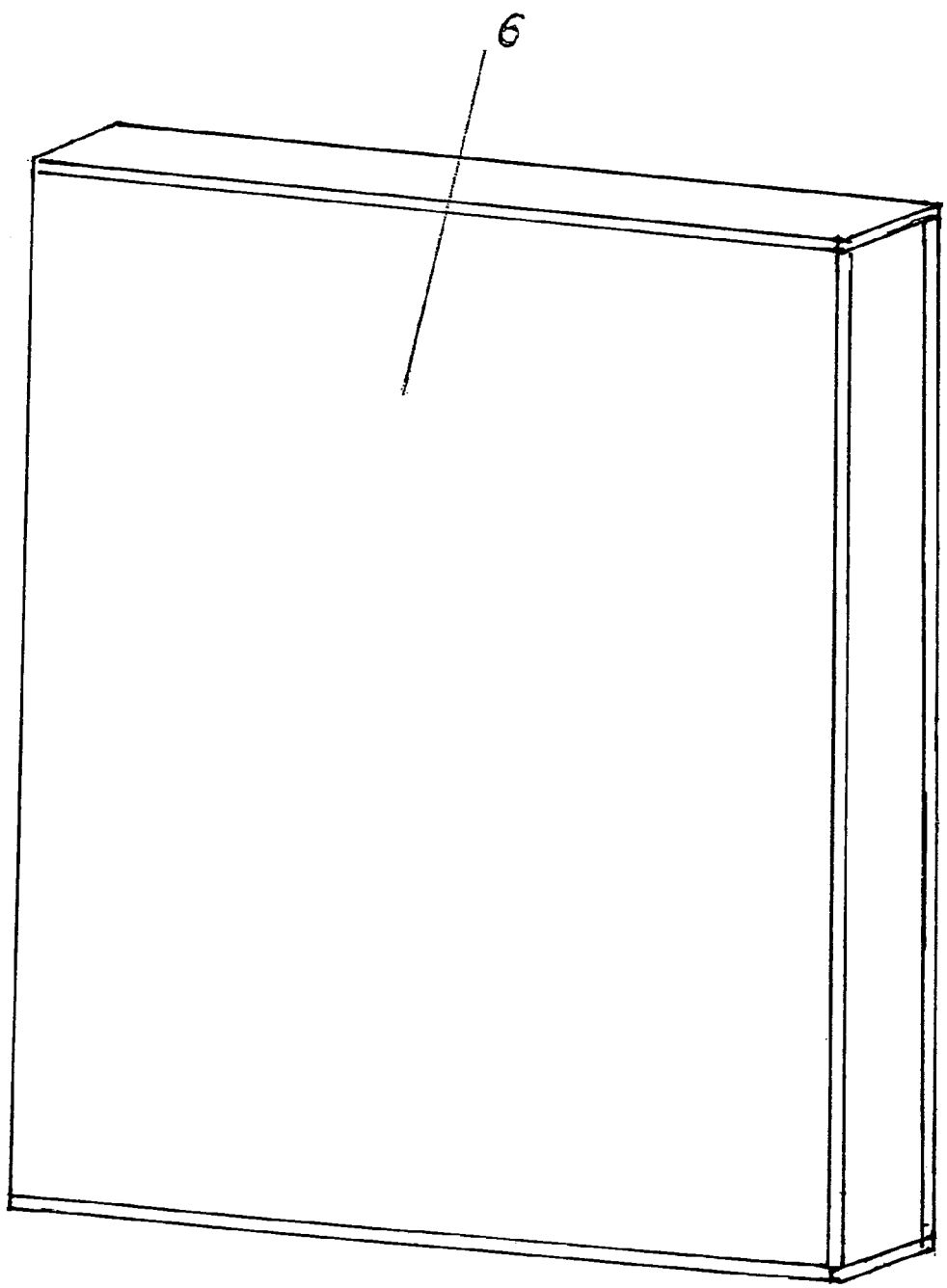
FIG. 7 is a view showing a glass container which is filled with potassium chloride of the inventive electrical storage battery.
Figure 8:
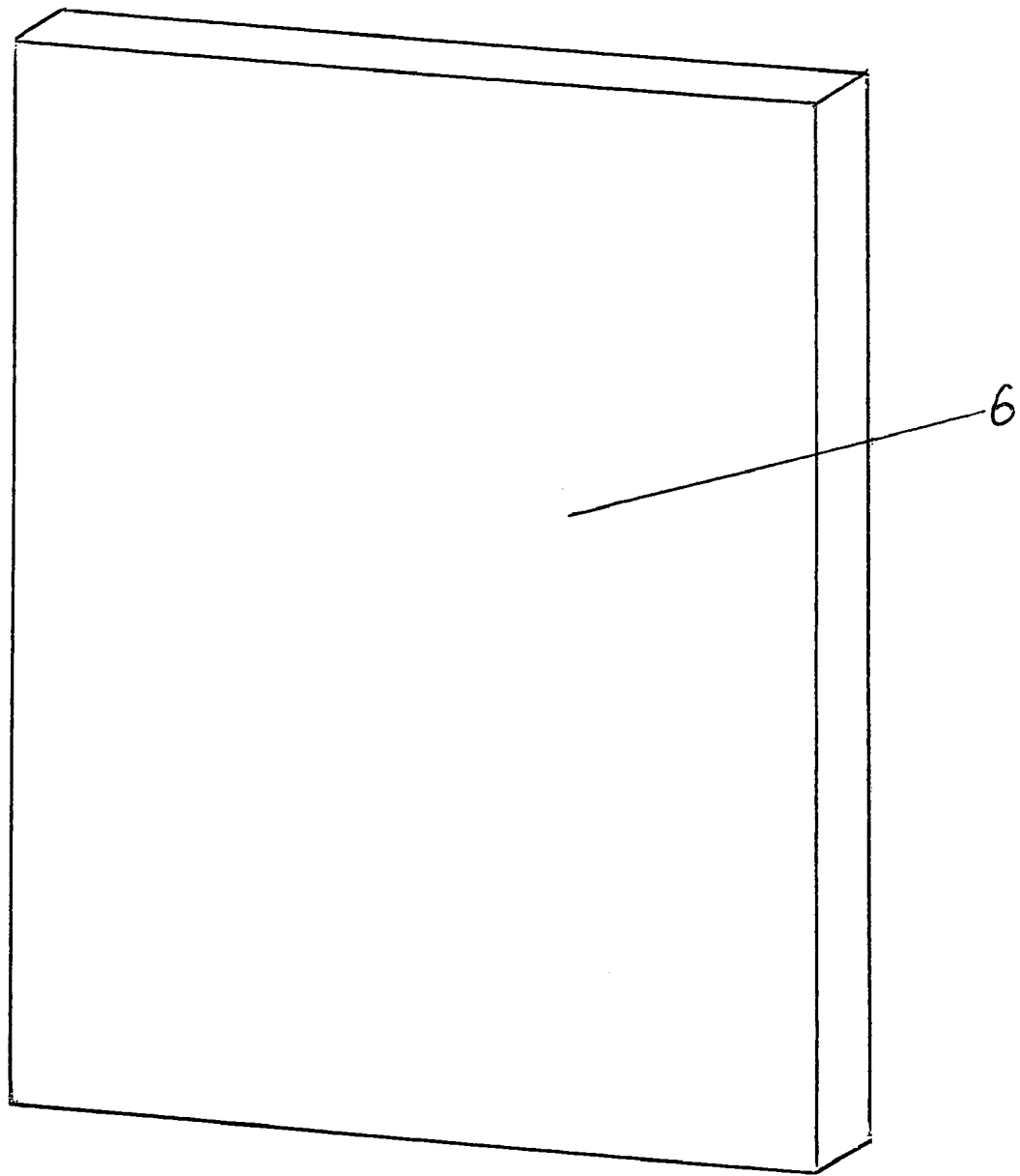
FIG. 8 is a view showing a plate composed of molten quartz of the inventive storage battery.

A plate composed of molten quartz ($SiO_2$) with a break through voltage limit $6.5 \times 10^{11}$ volt/meter shown in FIG. 8 or a glass box filled with a potassium chloride (NaCl) with a break-through voltage limit $1.5 \times 10^{11}$ volt/meter shown in FIG. 7 is placed in the electrical field between the front walls 1 and 1' of the vessels and creates huge resistance to break through of electrical field of high magnitude between the front walls of the vessels during charging of the battery. With the thickness of this layer of 2 cm a triple reserve for through, it is possible to charge the battery to $10^9$ volt. Such high voltage makes possible accumulation of huge energy in the electrical storage battery of the present invention.

The electrical storage battery in accordance with the present invention can be charged to voltage of very high magnitude with a charging device having a low voltage. The capacitor formed by the copper electrodes 1 and 1' which face one another and form front walls of the vessels, is preliminarily charged to a small voltage, for example 220 volt, and so that one electrode for example 1 has a positive charge and the other electrode for example 1' has a negative charge as shown in FIG. 3. During this preliminary charging, different-sign charges on the copper electrodes 1 and 1' are provided due to mutual attraction on the exterior surfaces of the copper electrodes 1 and 1' or in other words on the surfaces which face one another. As a result, the electrical field is located in the space between the exterior surfaces of the electrode 1 and 1' as shown in FIG. 2.

Power flux lines of the electrical field start on the exterior surface with positive charges plus and end on the exterior surface with negative charge minus. Inside the copper electrodes 1 and 1' in FIG. 3, as a result of good movability of electrons inside the metal, there is no electrical field. When an electrostatic field is produced in the metal, electrons move in the electrostatic field and, since they can not move beyond the limits of the metal, this movement leads to redistribution of density of the electrons and to generation of electrostatic fields of opposite direction. As a result, the electrostatic field inside the metal disappears and becomes equal zero. Due to the continuity there is no electrostatic field on the surface of the copper electrodes 1 and 1', which faces the electrolyte. All charges of the copper electrodes 1 and 1', as a result of mutual attraction of the charges with opposite signs to one another, are accumulated at the exterior surfaces of the copper electrodes 1 and 1'. Thus, after the preliminary charging, in the vessel 2 the positive copper electrode 1 is located with positive charges accumulated on the front surface, and in the vessel 2' the negative copper electrode is located with negative charges accumulated on the front surface of the electrode 1'. These different-sign charges are attracted to one another, and therefore their position on the surfaces which face toward one another are fixed. The surfaces of the copper electrodes 1 and 1' of the vessels are much greater than a distance between them, and therefore the electrical field located between the electrodes is homogenous.

Figure 9:
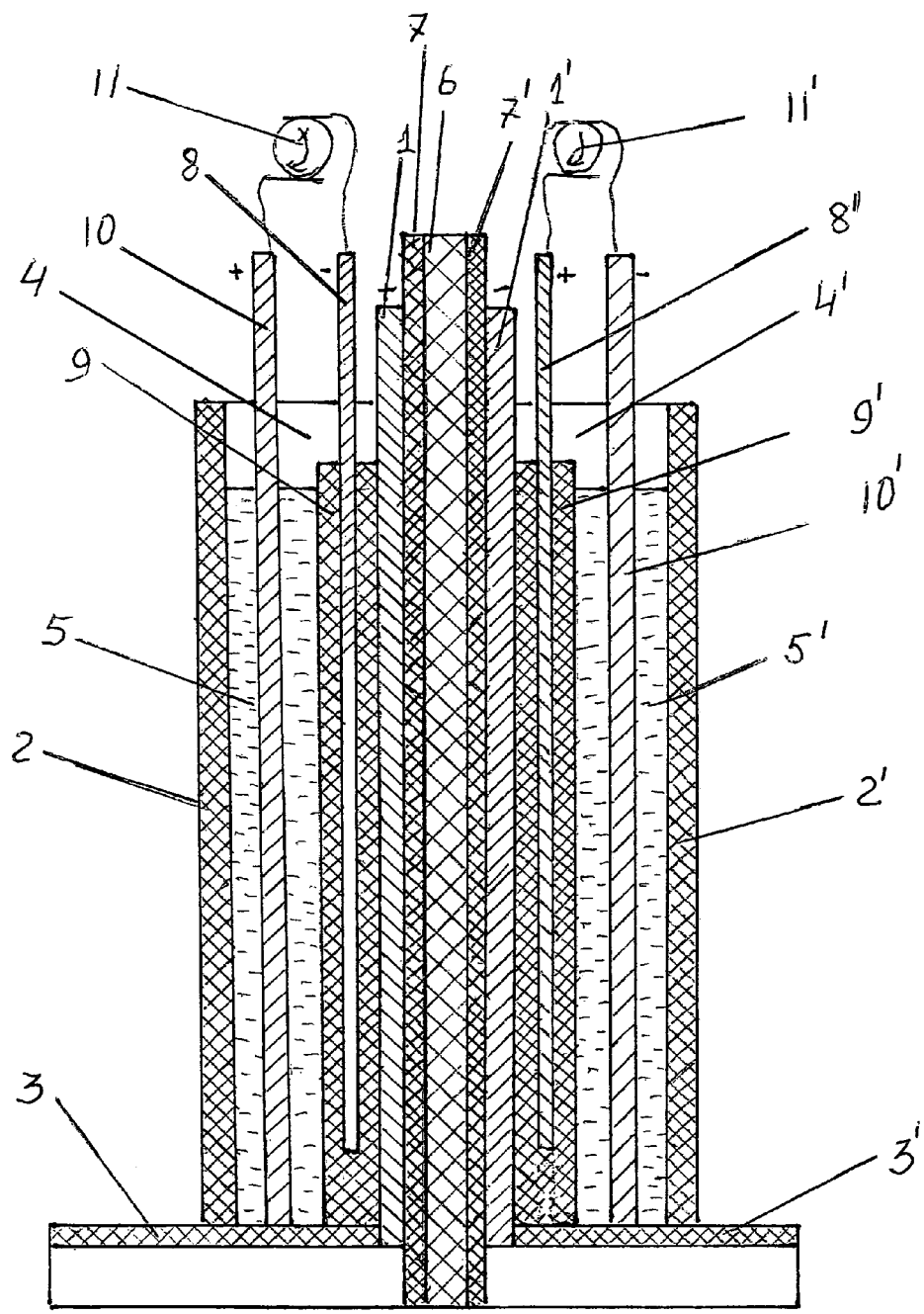
FIG. 9 is a view illustrating the process of charging of the inventive electrical storage battery.

After the preliminary charging, in order to charge the battery to very high voltages, a charging device 11 shown in FIG. 9 is applied in the vessel 2 with the positive copper electrode 1 between the copper sheath 8 surrounded by the dielectric 9 with high dielectric permeability and the additional copper electrode 10. A small voltage is applied by the charging device 11, for example 220 volt. The copper electrode 10 will have a positive charge, while the copper sheath 8 surrounded with the dielectric 9 will have the negative charge. In the vessel 2' shown in FIG. 3 with negative copper electrode 11', a small voltage for example 220 volt is applied by another charging device 11' between the auxiliary copper electrode 10' and the copper sheath 8' surrounded by the dielectric 9'. The additional electrode 10' has a negative charge, while the copper sheath 8' surrounded by dielectric 9' has a positive charge. Therefore, in the vessels, the electrodes have opposite sign potentials. The electrolyte 5 and 5' in the vessels 2 and 2' has positive ions $Cu^{++}$ and negative ions $SO_4^{--}$. In the vessel 2 with the positive copper electrode 1, when the voltage is applied between the auxiliary copper electrode 10 with positive charge and the copper sheath 8 with negative charge surrounded by the dielectric 9, the positive ions $Cu^{++}$ move in direction toward the polarized dielectric 9, or in other words move from plus to minus and are accumulated on the surface of the dielectric. Therefore, the copper sheath 8 with the negative charge surrounded by the polarized dielectric, when on the outer surface of the dielectric layer positive ions $Cu^{++}$ are present, is converted into a capacitor with a great capacity with a layer of the polarized dielectric with high dielectric permeability $\epsilon=7000$ in which the copper sheath 8 forms a negative electrode, while the layer of positive ions $Cu^{++}$ deposited from the electrolyte on the surface of the dielectric 9 form a positive electrode.

In the vessel 2' with the negative copper electrode 1', when the voltage is applied between the auxiliary copper electrode 10' with negative charge and the copper sheath 8' with positive charge surrounded by the polarized dielectric 9', negative ions $SO_4^{--}$ move in direction toward the dielectric 9' and are accumulated on its surface. The copper sheath 8' with the positive potential surrounded by the polarized dielectric 9' with the layer of negative ions $SO_4^{--}$ at the outer surface of the dielectric, is converted into a capacitor with a high capacity with the layer of polarized dielectric 9' having high dielectric permeability $\epsilon=7000$, in which the copper sheath 8' is a positive electrode, while the layer of negative ions $SO_4^{--}$ deposited from the electrolyte 5' on the surface of the dielectric 9' forms a negative electrode.

In the vessel 2 with positive copper electrode 1, the positive ions $Cu^{++}$ accumulated to the surface of the dielectric 9 which is tightly pressed against the surface of the copper electrode 1, are repelled from one another since they have the same charge, in a tangential plane or in other words in the plane of the dielectric, and moved to the edge of the dielectric and then they are simultaneously attracted to the surface of the copper electrode 1 from the side of the electrolyte 5 with a zero potential. Therefore, positive ions $Cu^{++}$ easily reach the inner surface of the copper electrode 1 which faces the electrolyte. When the positive ions $Cu^{++}$ leave the surface of the dielectric 9, new ions $Cu^{++}$ from electrolyte 5 reach the rear surface of the copper electrode 1 on the surface of the dielectric 9, as a result of the permanently applied potential difference between the auxiliary electrode 10 with this negative charge and the copper sheath 8 with positive charge, over all time of charging of the battery.

The positive ions $Cu^{++}$ which reach the surface of the copper electrode 1 from the side of the electrolyte 5, are neutralized as a result of the electrochemical reaction and take electrons from the positive copper electrode 1 so as to charge the neutral inner surface of the electrode 1 positively, while neutral atoms of copper Cu are deposited on the inner surface of the copper electrode 1. The positive charges in the metal are repelled from one another since they are identical charges, and there is not enough negative electrons, which leads to a slow redistribution of electrons. The missing electrons in the metal are easily replenished from the side of the exterior charged surface of the copper electrode 1, so that their positive charges are attracted and negative charges are repelled, from the side which is opposite to the negative electrode 1'. Electrons which leave the side of the exterior charged surface of the copper electrode 1 increase positive charge of the exterior surface and therefore the positive potential of the battery is increased. As a result of this redistribution inside the metallic copper electrode 1, the electrostatic field disappears and becomes equal to zero, and correspondingly, there are no electrostatic fields as a result of the law of continuity on an inner side of the copper electrode 1 which faces the electrolyte, while on the exterior surface of the copper electrode 1 the positive charge increases as a result of mutual attraction of charges having opposite signs on the exterior surface of the copper electrode 1'.

At the same time the vessel 2 with the positive copper electrode 1, negative ions $SO_4^{--}$ move from the electrolyte to the auxiliary copper electrode 10, which has positive potential, and reach its surface. As a result of the electrochemical reaction the negative ions $SO_4^{--}$ are neutralized and give their electrons to the auxiliary copper electrode 10. The radical $SO_4$ with two open bonds is connected with the copper auxiliary electrode 10 so as to form a chemical composition $CuSO_4$, which immediately is dissolved and comes back into the aqueous solution of electrolyte 5, where molecule $CuSO_4$ is dislocated and forms negative ion $SO_4^{--}$ and new positive ion $Cu^{++}$ as a result of dissolving of the auxiliary copper electrode 10. As a result, a negative ion $SO_4^{--}$ is returned into the electrolyte 5, and due to the new positive ion $Cu^{++}$ in the electrolyte 5, the positive ion $Cu^{++}$ which left the electrolyte 5 for charging of the positive copper electrode 1 in the vessel 2 is compensated.

Therefore, as a result of the electrochemical reaction on the auxiliary copper electrode 10 the concentration and neutrality of the electrolyte 5 is maintained, and only mass of copper of the auxiliary copper electrode 10 changes; its mass is reduced, while the mass of the copper electrode 1 is increased. This is taken into consideration when the masses of copper electrodes are selected. The mass of the auxiliary copper electrode 10 is selected more than usual.

Correspondingly in the vessel 2' with negative copper electrode 1', negative ions $SO_4^{--}$ are accumulated on the surface of the polarized dielectric 9' which is tightly pressed against a surface of the copper electrode 1' from the side of the electrolyte 5', and they are repelled from one another since they have the same charge and move in a tangential plane to the edge of the dielectric surface and as a result of its pressing easily get on the surface of the copper electrode 1' from the side of the electrolyte 5. The negative ions $SO_4^{--}$ which reach the surface of the copper electrode 1' from the side of the electrolyte 5', as a result of the electrochemical reaction are neutralized and give their electrodes to the negative copper electrode 1', so as to charge this copper electrode 1' through the neutral inner surface at the side of the electrolyte 5' negatively. Electrons electrodes which reach the interior of the metal through the inner neutral surface of the copper electrode 1' are repelled from one another since they have the same sign and lead to immediate redistribution of density of the electrodes, so that electrons move to the exterior negative surface and increase its negative charge. As a result of attraction of charges of opposite signs, electrons which are located on the positive copper electrode 1 are attracted to the exterior surface of the copper electrode 1' in FIG. 1 and are fixed by this attraction on the surface of the copper electrode 1'.

When the negative ions $SO_4^{--}$ leave the surface of the dielectric 9' to reach the rear surface of the copper electrode 1', new ions $SO_4^{--}$ from the electrolyte 5' reach the surface of dielectric 9'. As a result of the applied difference of potentials between the auxiliary copper electrode 10' with negative sign and copper sheath 8' with positive sign over all time of charging of the battery. The radical $SO_4$ with two opens bonds is connected with the copper electrode 1' and forms chemical composition $CuSO_4$ which immediately is dissolved so as to return into the aqueous solution of electrolyte, whereas the molecule $CuSO_4$ is disassociated to form negative ions $SO_4^{--}$ and a new positive ion $Cu^{++}$, as a result of dissolution of the negative copper electrode 1'.

At the same time, and in the vessel 2' with negative electrode 1', positive ions $Cu^{++}$ move toward the auxiliary copper electrode 10' which has minus potential. The positive ions $Cu^{++}$ which reach the surface of the auxiliary copper electrode 10' are neutralized because of the electrochemical reaction, so as to take electrons from the auxiliary copper electrode 10' as shown in FIG. 3, and a neutral atoms Cu are deposited on the surface of the auxiliary copper electrode 10'.

Therefore first of all the neutrality of the electrolyte 5' is maintained, since the generated new positive ions $Cu^{++}$ on the negative copper electrode 1' are neutralized on the auxiliary copper electrode 10' and leave the electrolyte 5', and therefore close the circuit of the charging device. Secondly, the concentration of the electrolyte 5' is maintained, which provides a stable operation during charging of the battery. As a result, during charging of the battery it is possible to use a very small quantity of electrolyte 5, 5' due to small transverse dimensions of the vessel, and therefore to make the battery exceptionally small. The whole process of charging of the battery actually includes a reduction of mass of the negative copper electrode 1' and increase of mass of the auxiliary copper electrode 10'. The reduction of mass of the negative copper electrode 1' can be taken into consideration initially, by selecting the mass of the negative copper electrode 1' with a certain reserve by 2 g, since the discharge current of the battery is very small.

Figure 6:
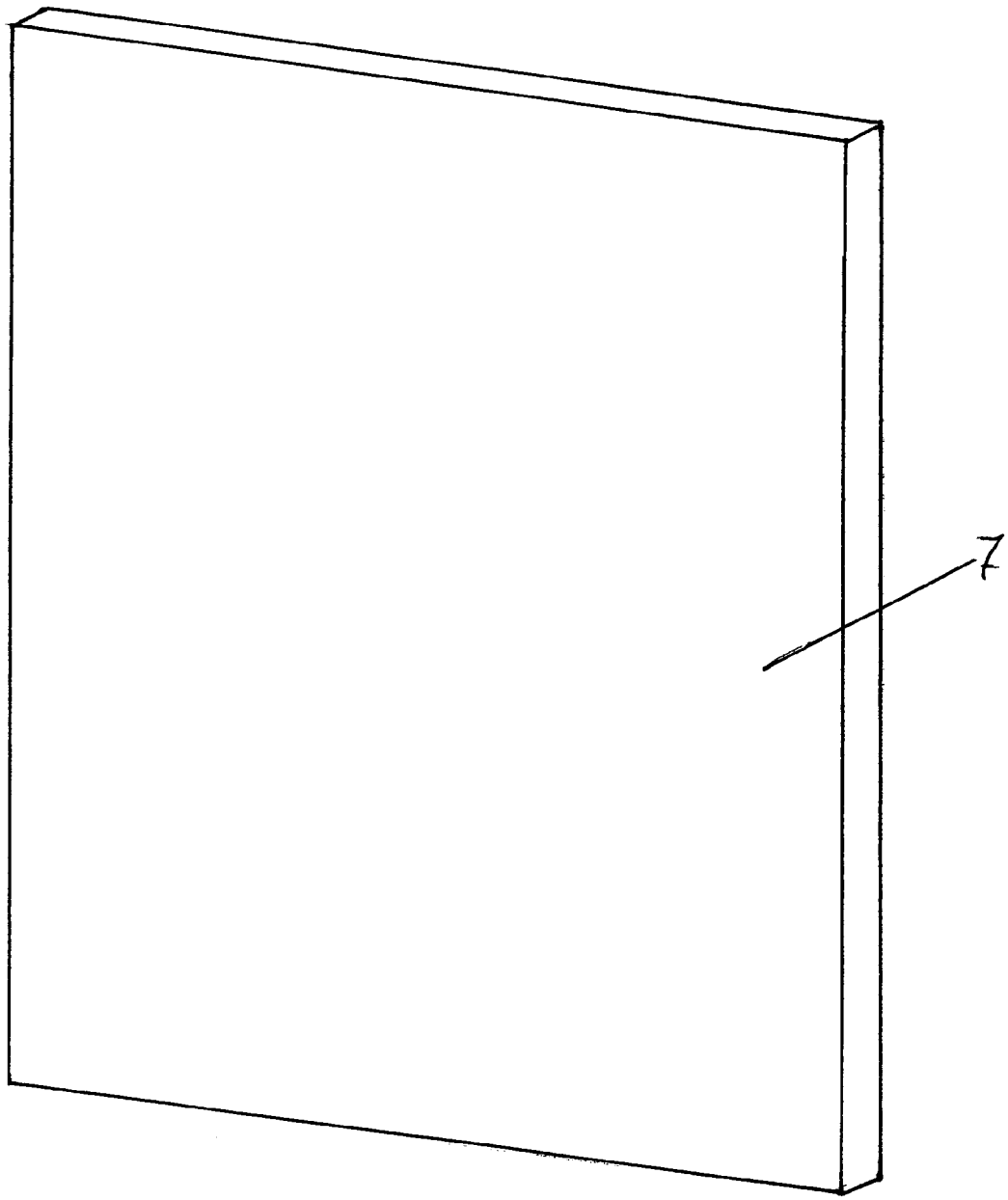
FIG. 6 is a view showing a plate composed of dielectric with a great dielectric permeability.

As mentioned above, in order to provide a high capacity of the battery between the front walls of the copper electrodes 1 and 1', the dielectric with a very high dielectric permeability is located between them as shown in FIG. 6. Its area is equal to the area of the surface of the copper electrodes 1 and 1'. This dielectric increases the capacity of the battery 7000 times.

When the battery operates with a high voltage $10^9$ volt and an electric motor has power 100 kW the discharge current is very small, in particular 100 µamp. With this small discharge current, an automobile can cover a distance of 400,000 miles without recharging of the battery.

During charging of the battery, in the course of accumulation of electric charges of different signs of the outer surfaces of the copper electrodes 1 and 1', forces of attraction are generated which increase with the increase of density of charge at the front wall of the positive copper electrode 1 and correspondingly at the front wall of the negative copper electrode 1'. This increasing force of attraction contributes to accumulation of positive charges in the front wall of the copper electrode 1 and a negative charges on the front wall of the copper electrode 1'. This increasing force represents an increasing electrical field. Since the power lines of the electrostatic field start from the positive charge and end at the negative charge, therefore with high number of charges on the front surfaces of the copper electrode 1 and the copper electrode 1', the electric field will be concentrated between the front surfaces of the copper electrode 1 and 1'.

The intensity of the electric field inside the metal of the copper electrode 1 with the copper electrode 1' and on the surfaces facing toward the electrolytes 5 and 5' remains equal to zero. Therefore the battery which in fact represents a capacitor with the copper electrodes 1 and 1' placed opposite to one another can be charged from the rear side by means of the electrolyte 5, 5' to very high value with the charging device having low voltage, for example 220 volt. The only limitation is to prevent a break through. In order to completely guarantee that the breakthrough will not occur during charging of the battery to very high voltage of up to $10^9$ volt between the walls of the positive electrode and negative electrode 1', the layer of material 6 is placed in FIG. 3, which has a high resistance against the breakthrough.

Such materials can be for example NaCl, which fills a glass or plastic box 6 (FIG. 7), placed in a plastic bag. Then air is aspirated from the bag and the bag is soldered. Therefore, NaCl is dense and does not have air, which makes it more reliable against the breakthrough. This material can be also a molten quartz, $SiO_2$, and the plate 6 can be a homogenous layer (FIG. 8). The above mentioned materials are inexpensive and their manufacture does not pose any problems.

NaCl as a breakthrough preventing a material can maintain the density of the electric field $\epsilon=1.5\times10^{11}$ volt/meter, while the molten quartz can $\epsilon=6.5\times10^{11}$ volt/meter. The thickness of the material can be for example 2 cm. The NaCl element can hold voltage $3\times10^9$ volt, while the plate of molten quarz can hold voltage $13\times10^9$ volt.

When the process of charging is finished, the electrolyte 5, 5' in both vessels 2 and 2' is removed, and the accumulated energy of the battery is located at the outer surfaces of the copper electrodes 1 and 1', while the electrolyte was used only as a source of ions for charging with the battery. The cover is closed, and the battery is ready for its discharging during use.

Now the process of discharging will be explained. The battery has a huge storage of electrical energy $W=2.5\times10^{12}$ j. A small part of electrical energy (in absolute values it is substantially great) is taken from the battery for operation of an electric motor and it is performed in a rational mode. This means that due to a very high voltage $V=10^9$ volt a takeup of energy on the terminals of the battery for operation of the electric motor $W=10^5$ watt takes place at very low currents $I=100$ μamp. Low currents of discharge allow to take a power necessary for operation of the electric motor during a very long time without recharging of the battery.

During this process it is necessary that a consumer of electrical energy, namely the electric motor operates also in a rational mode. For this purpose it is necessary that on the terminals of the electric motor there is a lower voltage, and in order to maintain the taken power, it is necessary to have great currents. This leads to a simplification of the construction of the electrical motor and providing favorable conditions for it. It is also necessary that from a huge storage of electrical energy in the battery $W=2.5\times10^{12}$ j only that little part of energy is taken, which is necessary for the operation of the electric motor or in other words 100 k Watt (if necessary it is of course possible also to take $W=200$ kWatt or $W=300$ kWatt, or in other words whatever is needed), and thereby completely exclude a discharge at a high voltage on the terminals of the battery of the whole stored energy in the battery.

The reduced voltage which is supplied to the terminals of the electric motor must be stable during the whole operation of the electric motor. This guarantees a constant current and a stable operation of the electric motor. Such a mode of operation is performed with the use of an energy-transmitting device, which includes a system of feedback during the process of discharge of the battery.

Figure 10:
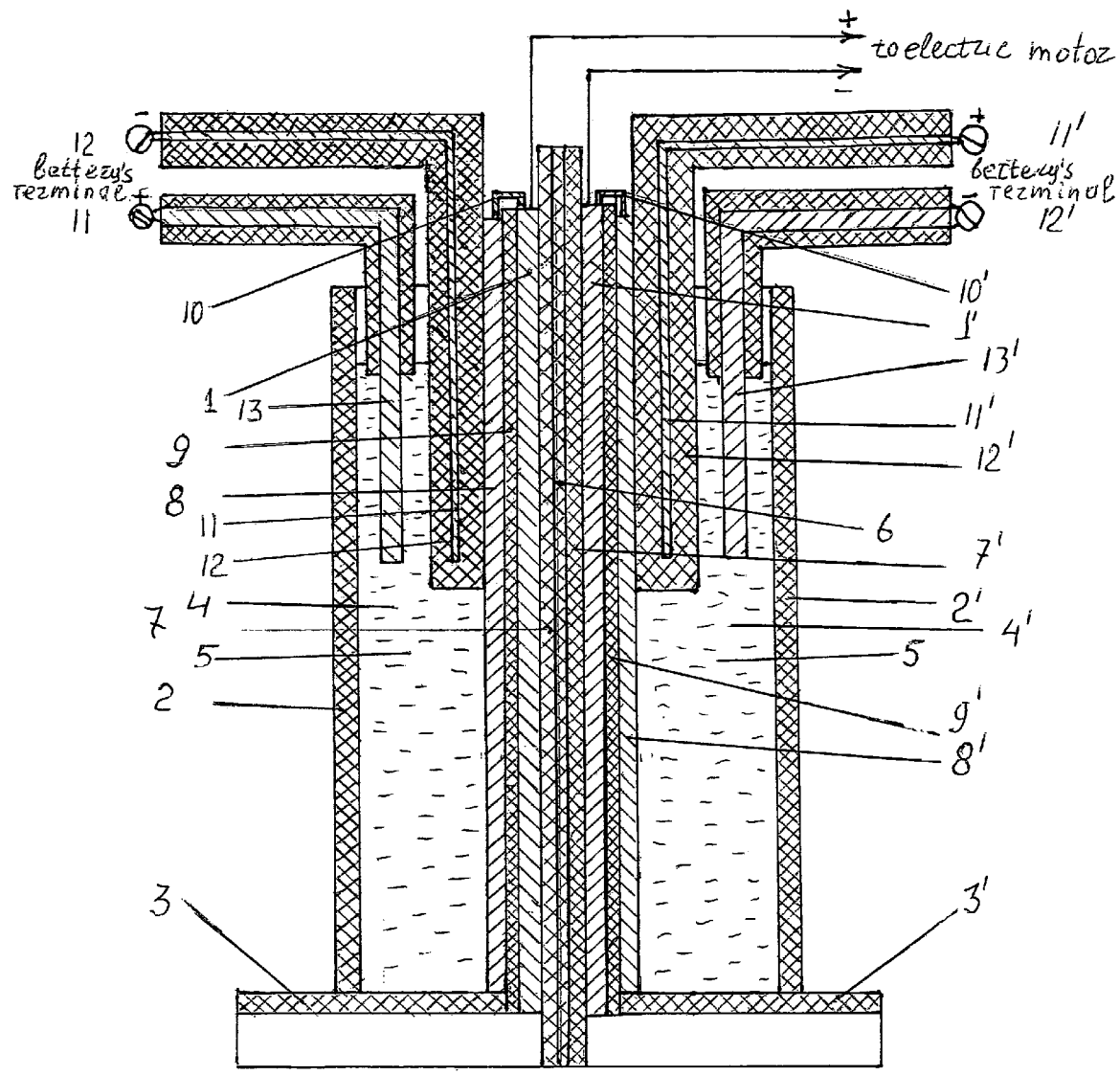
FIG. 10 is a view showing a transverse cross-section of an energy transmitting device.

The energy-transmitting device contains a vessel 2 and a vessel 2' shown in FIG. 10, each formed as a parallelepiped, in which two side walls 4 and a rear greater wall 2 are formed of a dielectric material and also the greater front wall 1 is composed of a copper sheet. These walls are hermetically connected with one another to form the parallelepiped. Two parallelepiped 2 and 2' shown in FIG. 10 are located one near the other and face one another with their great copper electrodes 1 and 1'. A distance between the vessels 2 and 2' or in other words between the copper electrode 1 and the copper electrode 1' is not great. Transverse sizes 4 in FIG. 1 of the vessel 2 and the vessel 2' in FIG. 10 are not great when compared with the front sizes 1 and 2 in FIG. 1.

Supply of energy from the battery to the energy-transmitting device is performed in the following manner. The vessel 2 and the vessel 2' of FIG. 10 is filled with an aqueous solution of $CuSO_4$. In the vessel 2 and in the vessel 2' the inner surface of the copper electrode 1 and correspondingly the inner surface of the copper electrode 1' are covered with an insulating layer 9. Therefore, the surface of the copper electrode 1 and the copper electrode 1' facing the electrolyte 5 and 5' are insulated from the electrolyte. This is done in order to avoid unlimited supply of energy from the battery directly through the electrolyte from the back surface of the copper electrode 1 and the copper electrode 1'.

A copper plate 8 which has an electrical contact 10 with an outer surface of the copper electrode 1 is arranged at the inner surface of the copper electrode 1 in FIG. 10 facing the electrolyte. A copper plate 8' which has an electrical contact 10' with an outer surface of the copper electrode 1' is correspondingly arranged near the inner insulated surface of the copper electrode 1' facing the electrolyte 5'.

A dielectric 12 is tightly pressed in the vessel 2 shown in FIG. 10 to the surface of the copper plate. This is a plate composed of a molten quartz $SiO_2$, in which the copper plate 11 is located, with a very small transverse cross-section. Correspondingly, a dielectric 12' is tightly pressed in the vessel 2' to the surface of the copper plate 8' and formed as a plate of molten quartz $SiO_2$, in which the copper plate 11' with a very small cross-section is located. Transverse sizes of the plate from a molten quartz for example 4×4 cm reliably protect from electrical breakthrough with a great reserve (13 times) at $V=10^9$ volt at the terminals of the battery.

The length of the quartz plate immersed in the electrolyte, with transverse sizes 4×4 cm, together with the copper plate located in it and having a small transverse cross-sections, determines the power which is taken from the battery. The deeper the quartz plate 12 in the vessel 2 and correspondingly the quartz plate 12' in the vessel 2' immersed in the electrolyte 5, the greater the power taken from the battery. An auxiliary copper electrode 13 is arranged near the plate of molten quartz 12 in the vessel 2. Correspondingly, an auxiliary copper electrode 13 is arranged near the plate of molten quartz 12' in the vessel 2', and the copper electrode 13 is arranged near the plate of molten quartz 12' in the vessel 2'. The auxiliary copper electrode 13 is insulated with a molten quartz with transverse sizes 4×4 cm over the length from the terminal (copper electrode 11) of the battery to the electrolyte 5 of the energy-transmitting device (FIG. 10) in the vessel 2. Correspondingly, the auxiliary copper electrode 13' in the vessel 2' is insulated with the molten quartz with transverse cross sizes 4×4 cm over the length from the second terminal (copper electrode 12') of the battery to the electrolyte 5' in the energy-transmitting device (FIG. 10).

The capacitor which is formed by the copper electrodes 1 and 1' in FIG. 10 which face one another and which are the front walls 1 and 1' of the parallelepiped is preliminarily charged to the required voltage, for example to 220 volt. One electrode 1 in FIG. 10 has the sign +, while the electrode 1' has the sign −. With such preliminarily charging, the different-sign charges located on the opposite copper electrodes 1 and 1', as a result of mutual attraction are located on the outer surfaces of the copper electrodes 1 and 1' in FIG. 10, or in other words on the surfaces of the electrodes facing one another. In these conditions the copper plate 8 in the vessel 2, having the electrical contact 10 with the exterior surface of the copper electrode 1, also has the same sign + and correspondingly the copper plate 8' in the vessel 2' having the electrical contact 10' with the outer surface of the copper electrode 1' also has the sign −.

After the preliminarily charging the supply of energy from the battery where the energy $W=2.5\times10^{12}$ J is accumulated to the energy-transmitting device shown in FIG. 10 and through the energy-transmitting device to the terminals of the electrical motor is performed in the following manner.

The difference of potentials $V=10^9$ volt which is at the terminals 11 and 12 at the battery in the vessel 2 in FIG. 10 is applied between the copper plate 11 with a very low transverse cross-section located inside a very strong insulator formed by the plate of molten quartz 12 which is tightly pressed against the surface of the copper plate 8, and the copper auxiliary copper electrode 13 near it.

The difference of potentials $V=10^9$ volt from the batteries applied so that to the copper plate with a very small transverse cross-section 11 located inside the molten quartz 12, a potential minus is applied, while to the auxiliary copper electrode 13 located near it, a potential plus is applied. Positive ions $Cu^{++}$ in the strong electric field which is formed in this way between the copper plate with a very low transverse cross-section 11 and an auxiliary copper electrode 13 move in direction to the quartz plate and accumulate on its surface. As a result, the copper plate 11 with a very small transverse cross-section located inside the plate of the molten quartz 12, when on the outer surface of the quartz layer the positive ions $Cu^{++}$ are located, is converted into a capacitor with a very small capacity $C=2\times10^{-13}$ farad, due to the small transverse cross-section of the copper electrode 11 and low dielectric permeability of quartz $\epsilon=3.75$ and a great distance formed between the copper plate 11 and the surface of the quartz, where the positive ions $Cu^{++}$ are accumulated. The energy in such a capacitor at the voltage $V=10^9$ volt is $$W = \frac{CV}{2} = 10^5 j.$$

Thereby from the huge quantity of energy located in the battery $W=2.5\times10^{12}$ joule, only that small part of the energy $W=10^5$ joule is taken which is necessary for the operation of the electric motor. The thusly formed capacitor in principle can not take more energy.

The positive ions $Cu^{++}$ which are accumulated on the surface of the molten quartz 12 which is tightly pressed against the copper plate 8 are repelled from one another as single-side charges in a tangential plane, moved to the edge of the quartz plate 12 and reach the copper plate 8 and charge it positively. The copper plate 8 which is insulated from the inner surface of the copper electrode 1 and thereby can not transfer the unlimited quantity of energy to the copper electrode 1 through the inner surface of the copper electrode 1. However, the copper plate 8 is connected by the electrical contact 10 with the outer surface of the copper electrode 1 and charges this outer surface positively. The positive charge on the outer surface of the copper electrode 1 is fixed on this surface as a result of the mutual attraction from the side of the outer surface of the copper electrode 1' having a negative charge on its outer surface.

During the process, in which the positive ions $Cu^{++}$ leave the surface of the dielectric formed by the quartz plate 12 and get on the copper plate 8, on the surface of the quartz plate 12 new ions $Cu^{++}$ are supplied from the electrolyte 5 as a result of constantly applied difference of potentials $V=10^9$ volt between the auxiliary copper electrode 13 with the plus sign and the copper plate 11 with a very low transverse cross section with the minus sign located inside the plate of the molten quartz 12. The positive ions $Cu^{++}$ arrived at the surface of the plate 8 are neutralized as a result of the electrical chemical reaction and take electrons from the copper plate 8 and charge this plate positively. The copper plate 8 is connected by the electrical contact 10 with the outer surface of the copper electrode 1 and equalizes its potential with it so as to charge the outer surface of the copper electrode positively. Neutral atoms of copper Cu are deposited on the surface of the copper plate 8. Mass of the copper plate 8 is increased.

At the same time, in the vessel 2 with the positive copper electrode 1 in the electrolyte 5 the negative ions $SO_4^{--}$ move to the auxiliary copper electrode 13 which has the plus potential and get on its surface. As a result of the electrochemical reaction the negative ions $SO_4^{--}$ are neutralized and give their electrons to the auxiliary copper electrode 13 so as to close a current flow between the potential plus and the potential minus. The base $SO_4$ with two open bonds is connected with the auxiliary copper electrodes 13 so as to form a chemical composition $CuSO_4$, which is dissolved immediately or in other words is returned into the aqueous solution of $(CuSO_4)$, where molecule $CuSO_4$ disassociate so as to form the negative ions $SO_4^{--}$ and a new positive ion $Cu^{++}$ due to dissolving of the auxiliary copper electrodes 13. As a result, the negative ion $SO_4^{--}$ returns into the electrolyte 5, and because of the new positive ion $Cu^{++}$, in electrolyte there is compensated the positive ion $Cu^{++}$ which left the electrolyte 5 for charging the positive copper electrode 1 in the vessel 2 and as a neutral atom deposited on the surface of the plate 8. Therefore, as a result of the electrochemical reaction on the auxiliary copper electrode 13, as a whole in the vessel 2 concentration and neutral nature of the electrolyte 5 is preserved and only mass of copper of the auxiliary copper electrode 13 changes. The mass of the auxiliary copper electrode 13 reduces, while the mass of the copper plate 8 increases. This is taken into consideration during the selection of the masses of the copper electrodes. When the discharge current on the electric motor is 3 amp during $T=8\times10^3$ hours, or in other words when for example an electric car covered $L=400,000$ miles without recharging of the battery, the mass of the auxiliary copper electrode 13 in the vessel preliminarily is taken with a reserve by 10 kg.

Correspondingly, after the preliminary charging, the energy supply to the vessel 2' from the battery where a huge energy $W-2.5\times10^{12}$ j is accumulated to the energy-transmitting device of FIG. 10 and through the energy-transmitting device to the terminals of the electric motor is performed in the following manner.

The difference of potentials $V=10^9$ volt which takes place on the terminals 11' and 12' of the other battery in the vessel 2' in FIG. 10 is applied between the copper plate 11' with a very low transverse cross-section which is located inside a strong insulator formed by the plate of molten quartz 12' tightly pressed against the surface of the copper plate 8' and the auxiliary copper electrode 13' located near it. The difference of potentials $V=10^9$ volt from the battery is applied so that, to the copper plate 11" with a very small transverse cross-section and located inside the molten quartz 12', a potential plus is applied, while to the auxiliary copper electrode 13' located near it, a potential minus is applied. Negative ions $SO_4^{--}$ in the electrolyte 5' of the vessel 2' in the electrical field of high intensity formed in this way between the copper plate 11' with a small transverse cross-section and the auxiliary copper electrode 13' move in direction toward the quartz plate 12' and are accumulated on its surface. Thereby the copper plate 11' with the small transverse cross-section, located inside the plate of molten quartz 12' with a potential plus, in the case when on the outer surface of the quartz plate 12' there is a layer of negative ions $SO_4^{--}$, is converted into a capacitor with a very low capacity $C=2\times10^{-13}$ farad, due to the very small transverse cross-section of the copper electrode 11' and low dielectric permeability of quartz $\epsilon=3.75$ and great distance between the copper plate 11' and the surface of the quartz 12' were negative ions $SO_4^{--}$ are accumulated. The energy which is provided in the capacitor formed in this way at the voltage $V=10^9$ volt is $$W = \frac{CV^2}{2} = 10^5 j.$$

Thereby from the huge quantity of energy in the battery $W=2.5\times10^{12}$ J, only a small part of energy $W=10^5$ J is taken which is necessary for operation of the electrical motor. The thusly formed capacitor can not take more energy.

The negative ions $SO_4^{--}$ accumulated in the vessel 2' on the surface of the molten quartz 12' which is tightly pressed against the copper plate are repelled from one another as same-sign charges, in tangential plane, or in other words in the plane of the dielectric, and move to the edge of the quartz plate 12' and get on the copper plate 8' so as to charge it negatively. The copper plate 8' which is insulated from the inner surface of the copper electrode 1' of FIG. 10 by the insulating layer 9' can not therefore transfer an unlimited quantity of energy 1' to the inner surface of the copper electrode 1'. However, the copper plate 8' is connected by the electrical contact 10' with the outer surface of the copper electrode 1' and charges this surface negatively. The negative charge on the outer surface of the copper electrode 1' is fixed on this surface as a result of the mutual attraction from the side of the copper electrode 1 having the positive charge on its surface.

In the process when the negative ions $SO_4^{--}$ leave the surface of the dielectric formed by the quartz plate 12' and get on the copper plate 8', new ions $SO_4^{--}$ from the electrolyte 5' get on the surface of the quartz plate 12' as a result of the constantly applied difference of potentials $V=10^9$ volt between the auxiliary copper electrode 13' with the sign minus and the copper plate 11' with very small transverse cross-section with the sign plus located inside the quartz plate 12'.

The negative ions $SO_4^{--}$ which got on the surface of the copper plate 8' charge it negatively. The copper plate 8' connected with the electrical contact 10' with the outer surface of the copper electrode 1' equalizes its potential with it so as to charge the outer surface of the copper electrode 1' in FIG. 10 negatively. The base $SO_4^{--}$ with two open bonds on the surface of the copper plate 8' is connected with the copper plate 8' so as to form the chemical composition $CuSO_4$, which is immediately dissolved and returned into the aqueous solution of the $(CuSO_4)$, where the molecule $CuSO_4$ dissociates to form the negative ion $SO_4^{--}$ and the new positive ion $Cu^{++}$ due to the dissolution of the copper plate 5''.

At the same time in the vessel 2' with the negative copper electrode 1', positive ions $Cu^{++}$ move to the auxiliary copper electrode 13' which has minus potential, and get on its surface. As a result of the electrochemical reaction, the positive ions $Cu^{++}$ are neutralized so as to take electrons from the auxiliary copper electrode 13' to close the circuit to the battery. The negative ion $SO_4^{--}$ is returned into the electrolyte 5' and the new positive ion $Cu^{++}$ leaves the electrolyte 5' and goes to the auxiliary copper electrode 13', where it is neutralized and as a neutral item Cu is deposited on its surface. Therefore as a result of the electrochemical reaction, concentration and neutral nature of the electrolyte 5' in the vessel 2' is maintained, and only mass of copper plate 18' changes, or in other words its mass is reduced, while the mass of the auxiliary electrode 13' increases. This is taken into consideration during a selection of the masses of copper electrodes. With a discharge current on the electric motor of an electric car 3 amp during $8\times10^3$ hours, or in other words when the electric car covers 400,000 miles without the additional recharging of the battery, the mass of the copper plate 8' initially is provided with a reserve greater by 10 kg.

With increase of the positive voltage of the copper electrode 1 in the vessel 2 and on the copper electrode 1' in the vessel 2' FIG. 10, as a result charges accumulate on their outer surfaces and retained there due to mutual attraction of the different-sign charges on the outer surfaces. In the same way the positive potential of the copper plate 8 connected by electrical contact 10 with the outer surface of the copper electrode 1 increases, and correspondingly the negative potential of the copper plate 8' connected by the electric contact 10' with the outer surface of the copper electrode 1' increases as well.

In the vessel 2 with the positive copper electrode 1 FIG. 10 the positive potential of the copper plate 8 increases, and correspondingly with the growth of the positive potential of the copper plate 8 the supply of positive ions $Cu^{++}$ from the surface of the dielectric formed by the quartz plate 12 to the copper plate 8 decreases. As a result, with the growth of the potential, the action of forces of braking on the positive ions $Cu^{++}$ increases and therefore the supply of energy from the battery (terminals 11 and 12) to the positive electrode 1 of the energy-transmitting system of FIG. 10 decreases. When the predetermined value of difference of potential 30 kvolt is reached, the supply of the ions $Cu^{++}$ to the copper plate 8 is stopped, and therefore the growth of the potential of the positive copper electrode 1 is stopped and its potential is retained at a fixed level. In the vessel 2' with the negative copper electrode 1' in FIG. 10, the negative potential of the copper plate 8' increases and correspondingly with the growth of the negative potential of the copper plate 8', the supply of negative ions $SO_4^{--}$ from the surface of the dielectric formed by the quartz plate 12' to the copper plate 8' reduces since with the growth of the negative potential of the copper plate 8' the action of forces of braking on the negative ions $SO_4^{--}$ is increased and thereby the supply of energy by the battery (terminals 11' and 12') to the negative electrode 1' in FIG. 10 of the energy-transmitting system decreases. When the predetermined value of the difference of potentials of the terminals of the electric motor, 30 k volt is reached, the supply of the negatively charged $SO_4^{--}$ is stopped and the potential is retained on the fixed level.

However, when energy is supplied from the energy-transmitting device to copper electrodes 1 and 1' in FIG. 10 to the operating electric motor, the potential of both copper electrode 1 and the copper electrode 1' naturally somewhat reduces, and the supply of the positive charges or ions $Cu^{++}$ in the vessel 2 and the negative charges or ions $SO_4^{--}$ in the vessel 2' is restored and they continue to be supplied to the copper electrodes 1 and 1' through the terminals, from which the energy is supplied to the electric motor. Thereby the flow of energy from the battery to the energy-transmitting device and from the energy-transmitting device to the electric motor is performed in a rational way.

The fixing of the constant difference of potentials 30 k volt on the terminals of the energy-transmitting device and correspondingly on the terminals of the electric motor is the result of realization of the system of feedback due to the insulation 9 of the inner surface facing the electrolyte 5 of the copper electrode 1, and charging through the copper plate 8 by the electrically connected contact 10 with the outer surface of the copper electrode 1, and correspondingly as a result of the insulation 9' of the inner surface facing to the electrolyte 5' of the copper electrode 1' and charging through the copper plate 8 by electrically connected contact 10' with the outer surface of the copper 1'.

The value of the fixed voltage between the copper electrode 1 and the copper electrode 1' in FIG. 10 is determined by the capacity of the capacitor formed by the copper electrodes 1 and 1' in FIG. 10 and the value of energy transmitted through the energy-transmitting device to the electric motor. The energy which is necessary from operation of the electric motor is accumulated on the copper electrode 1 with the sign of potential plus and on the copper electrode 1' with the sign of the potential minus in FIG. 10. For example the value of energy required for transmission to the electric motor is determined as 100 kWatt. The capacity of the capacitor is determined by the area of the copper electrodes 1 and 1' in FIG. 10, a distance between them, and the dielectric permeability $\epsilon$ of the dielectric 7, 7' located between the copper electrode 1 and the copper electrode 1' in FIG. 10. With the area of the copper electrodes 1 and 2, $S=0.2$ m$^2$ and the distance between the copper electrode 1 and the copper electrodes $\Delta=2\times10^{-2m}$ and the dielectrical energy of the dielectric 14 $\epsilon=10^7$, the voltage which is transmitted to the electric motor $V=10^4$ volt, with the current $I=10$ A. If $S=0.2$ m$^2$, then the voltage which is transmitted to the electric motor $V=3\times10^4$ volt and current $I=3$ Amp as shown in FIG. 10. If it is necessary through the energy-transmitting device to provide the transmission of 200 kWatt or 300 kWatt to the electric motor, then the parameters of the energy-transmitting device must be correspondingly different.

The fact that in the energy-transmitting device in FIG. 10, in the process of discharge of the battery the concentration and neutral nature of the electrolyte 5 are automatically maintained, means that the energy-transmitting device can take a small quantity of the electrolyte 5. This possible due to small transverse sizes of the vessel in the form of parallelepiped 2 and correspondingly of the vessel in the form of parallelepiped 2', FIG. 10, which results in a small weight and small size of the energy-transmitting device. As a result, the size of the battery with the energy-transmitting device is small, and the mass of the copper electrodes which are dissolved must be taken with a corresponding reserve. This is the way how charging of the battery is performed and also a transmission of energy from the battery which accumulates a huge energy $W=2.5\times10^{12}$ j is performed through the energy-transmitting device of a relatively small part of the energy which is necessary for operation of the electric motor (while in general this energy is great), during $8\times10^3$ hours. In this time an electric car will cover 400,000 miles without the recharging of the battery. In addition, the energy-transmitting device can reduce the voltage for example $3\times10^4$ times and increase the current $3\times10^4$ times. For example if at the output of the battery $V=10^9$ volt and $I=100$ µamp, at then the output of the energy-transmitting device $V=3\times10^4$ volt, and $I=3$ amp. However, it is also possible to provide at the output other parameters, such as for example $V=10^4$ volt and $I=10$ amp or $V=10^3$ volt and $I=100$ amp. In other words at the outlet it is possible to provide various parameters with corresponding parameters of the energy-transmitting device, which provides favorable conditions for the construction and operation of the electric motor.

While in the present application the electrodes are described as copper electrodes, the electrodes can be also composed of other metals which are capable of participating in electrochemical reactions with correspondingly selected electrolytes. For example, electrodes can be composed of zinc (electrolyte—Zn SO$_4^{--}$), silver (electrolyte—Ag SO$_4^{--}$).

It will be understood that each of the elements described above, or two or more together, may also find a useful application in other types of constructions differing from the types described above.

While the invention has been illustrated and described as embodied in electrical storage battery, and method of storing electrical energy, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A battery providing a storage of electrical energy with electrolytic processes of charging and discharging, comprising a first vessel having a front wall formed as an electrode; a second vessel having a front wall formed as an electrode, said vessels being arranged so that said front walls formed as electrodes face one another, said vessels being filled with an electrolyte, said vessels having other walls which are composed of dielectric.

2. A battery as defined in claim 1, wherein said vessels are formed as parallelepipeds.

3. A battery as defined in claim 1, wherein said electrodes which form front walls of said vessels are separated by dielectric partitions having a high resistance to an electrical breakthrough.

4. A battery as defined in claim 1, wherein said electrodes together form a capacitor and are charged so that one electrode has a positive charge, while the other electrode has a negative charge.

5. A battery as defined in claim 4, wherein said electric charges are concentrated only on surfaces of said electrodes which face one another and are attracted to one another, with an electrical field concentrated only between said surfaces, so that an electrical field inside the electrodes and on surfaces of the electrodes facing toward the electrolyte are not generated.

6. A battery as defined in claim 1, wherein said electrodes are chargeable so as to charge the electrical battery.

7. A battery as defined in claim 1; and further comprising additional electrodes providing charging of the battery by charges located in the electrolyte.

8. A battery as defined in claim 1; and further comprising a first auxiliary electrode which is hermetically surrounded by a dielectric and a tightly pressed with said dielectric against a surface of a positive one of said electrodes from a side of the electrolyte and has a minus potential provided by a charging device, and a second auxiliary electrode hermetically surrounded by a dielectric and tightly pressed with said dielectric against a surface of the other one of said electrodes and charge with a plus potential.

9. A battery as defined in claim 8, wherein said electrodes and said auxiliary electrodes are formed so that as a result of an electrochemical reaction in the battery masses of electrodes change, with a mass of one of the auxiliary electrodes reducing and a mass of the other of said auxiliary electrodes increasing.

10. A battery as defined in claim 9, wherein said auxiliary electrodes are formed so that their masses initially are such as to take into consideration the change of their masses in the process of charging of the battery.

11. A battery as defined in claim 1; and further comprising an energy-transmitting device for supplying energy from the battery to an electric motor.

12. A battery as defined in claim 1, wherein said energy-transmitting device is formed so that on terminals of the electric motor a low voltage and corresponding a high current is provided with maintaining it constant.

13. A battery as defined in claim 12, wherein said energy-transmitting device is formed so that it provides on terminals of the electric motor a stable reduced voltage over a whole period of operation of the electric motor.

14. A battery as defined in claim 1; and further comprising means located between said front walls of said vessels and having a high resistance against an electrical breakthrough.

15. A battery as defined in claim 14, wherein said means with high resistance to electrical breakthrough is means selected from the group consisting of a layer of NaCl and a layer of $SiO_2$.

16. A battery as defined in claim 1, wherein said parts of said vessels which are composed of a dielectric with high dielectric permeability.

17. A battery as defined in claim 1, wherein said electrodes are copper electrodes.

* * * * *